United States Patent [19]
Lewandowski et al.

[11] Patent Number: 6,101,442
[45] Date of Patent: Aug. 8, 2000

[54] SYSTEM AND METHOD FOR DETECTING A VALVE-RELATED FAULT CONDITION FOR AN INTERNAL COMBUSTION ENGINE

[75] Inventors: Edward J. Lewandowski, Scipio; Scott G. Decker, Columbus, both of Ind.

[73] Assignee: Cummins Engine Co. Inc.

[21] Appl. No.: 09/213,786

[22] Filed: Dec. 17, 1998

[51] Int. Cl.⁷ .................................................. G01M 15/00
[52] U.S. Cl. ........................................ 701/114; 73/119 R
[58] Field of Search .................................. 701/101, 102, 701/114, 29; 73/116, 119 R

[56] References Cited

U.S. PATENT DOCUMENTS

| | | | |
|---|---|---|---|
| 4,024,850 | 5/1977 | Peter et al. | 123/198 F |
| 4,562,728 | 1/1986 | Timmerman . | |
| 4,794,790 | 1/1989 | Margarit-Metaxa et al. . | |
| 5,033,290 | 7/1991 | Seki et al. . | |
| 5,446,664 | 8/1995 | Vossen et al. . | |
| 5,447,059 | 9/1995 | Miller et al. . | |
| 5,566,091 | 10/1996 | Schricker et al. . | |
| 5,642,284 | 6/1997 | Parupalli et al. . | |
| 5,644,073 | 7/1997 | Matsuno et al. . | |
| 5,696,676 | 12/1997 | Takaba . | |

FOREIGN PATENT DOCUMENTS

| | | |
|---|---|---|
| 1357392 | 6/1974 | United Kingdom . |
| WO 90/06432 | 6/1990 | WIPO . |
| WO 96/00943 | 1/1996 | WIPO . |

*Primary Examiner*—Andrew M. Dolinar
*Attorney, Agent, or Firm*—Baker & Daniels

[57] ABSTRACT

A system and method for detecting a fault condition in an internal combustion engine utilizes the intake air temperatures at each of a plurality of cylinder sections of the engine. An average value of the plurality of intake air temperatures is compared to each of the individual temperatures at discrete time increments. The rate of change of each intake air temperature relative to the average temperature value is assessed to determine if a valve-related fault condition has occurred. In a further feature of the system and method, a plurality of temperature differential values over several time increments are differentiated. The resulting plurality of differentiated values are integrated, or summed, over the time period, which result is compared to a threshold value indicative of a valve-related failure.

13 Claims, 5 Drawing Sheets

SYSTEM AND METHOD FOR DETECTING A VALVE-RELATED FAULT CONDITION FOR AN INTERNAL COMBUSTION ENGINE

BACKGROUND OF THE INVENTION

The present invention concerns the detection of fault conditions or failures in an internal combustion engine. In particular, the invention contemplates a system and method for detecting engine faults that are a product of engine valve and valve-related failures.

The typical internal combustion engine relies upon an arrangement of valves to control the intake and exhaust of gases to and from an engine cylinder. In a typical arrangement, the valves are spring-mounted within the engine block or head. The movement—i.e. the opening and closing—of the valves is typically controlled by a rocker assembly. The rocker assembly is driven by the engine crankshaft and utilizes an arrangement of cams to control the timing of the stroke of the valves in each cylinder.

Internal combustion engines include at least one valve per cylinder. In the case of a single valve cylinder, the valve is opened once for air intake, and a second time for exhausting combustion gases. In another type of engine, two such valves are provided, one for intake and one for exhaust.

Figure 1:
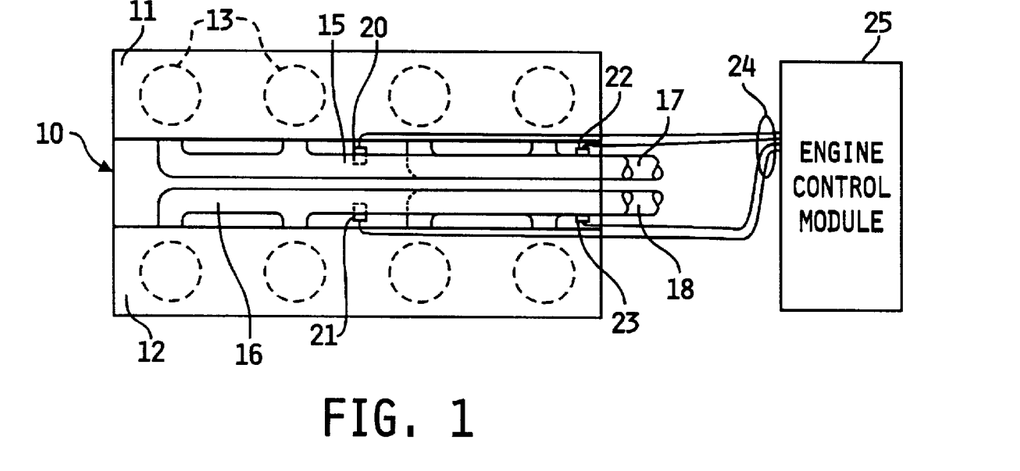
FIG. 1 is a top schematic representation of an internal combustion engine for use with the system and method of the present invention.

Air is supplied to the engine cylinders by way of an arrangement of manifolds. One type of engine is shown in FIG. 1, utilizing eight cylinders in a standard V-arrangement. Thus, the engine 10 includes a left cylinder bank 11 and a right cylinder bank 12. In this instance, the engine 10 can be regarded as divided into four cylinder sections or quadrants, with each quadrant being supplied by a separate intake manifold. For example, the two upper left cylinders in the figure are supplied with air through the left front air intake manifold 15. In a similar fashion, the right front quadrant of the engine 10 is fed through the right front air intake manifold 16, the left rear quadrant through the left rear air intake manifold 17, and the right rear by the right rear air intake manifold 18.

Figure 2:
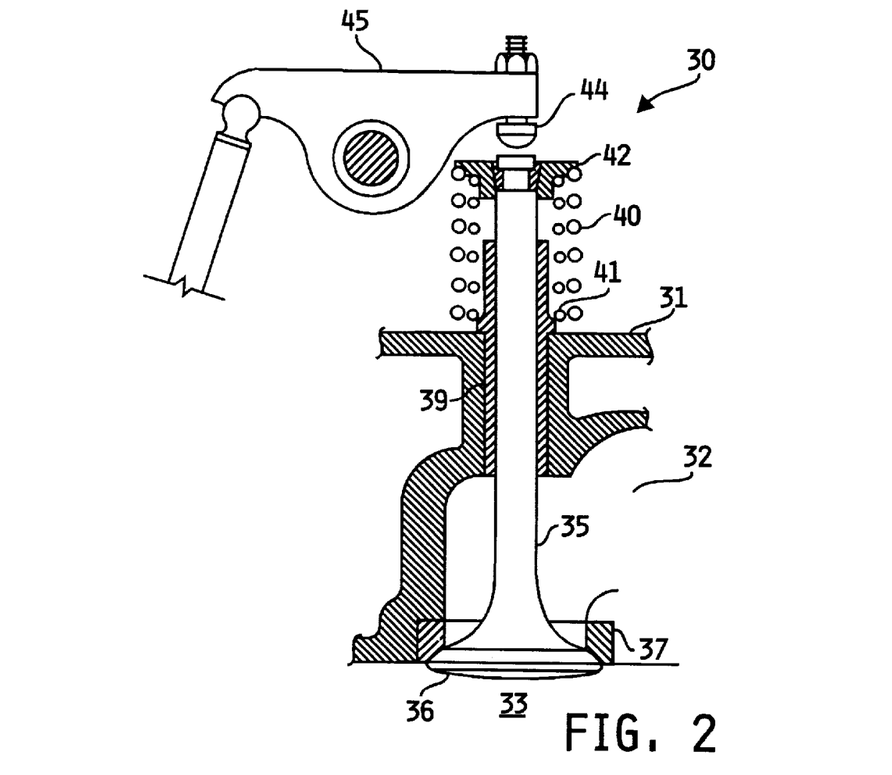
FIG. 2 is an enlarged partial cross-sectional view of a valve assembly typically used with the engine shown in FIG. 1.

As mentioned above, each cylinder is provided with an array of one or more valves. A typical valve assembly 30 is depicted in FIG. 2. The valve assembly 30 is mounted within the engine head 31. For an intake valve, the valve assembly is arranged between the air intake 32 and the engine cylinder chamber 33 to control the flow of air drawn from the intake and manifold into the cylinder.

The valve assembly includes a valve stem 35 that terminates in a valve head 36. The valve head 36 is configured to seal against a valve seat 37 disposed between the air intake 32 and the cylinder chamber 33. When it is operating properly, the valve head 36 is unseated from the valve seat 37 to introduce air into the cylinder chamber 33, and then subsequently sealed against the valve seat 37.

The engine head 31 supports a valve guide 39 through which the valve stem 35 reciprocates. An arrangement of springs, namely an outer spring 40 and an inner spring 41, provide an upward force to the valve stem 35. In this embodiment, a spring washer 42 is engaged at the end of the valve stem to trap the springs 40, 41 between the washer and the valve guide 39. The springs 40 and 41 are designed to provide an appropriate return force to pull the valve head 36 back into sealing engagement with the valve seat 37 at an appropriate time in the engine cycle.

The downward movement of the valve stem 35, and consequently the valve head 36, is governed by a rocker assembly 45. A tappet 44 at one end of the rocker assembly pushes down on the top of the valve stem 35 to free the valve head 36 from the valve seat 37. When the tappet 44 is retracted, the springs 40 and 41 operate to draw the valve head back into engagement with the seat 37.

As with any mechanical device, the valve assembly 30 is susceptible to failure in the harsh environment of the engine. Failures of the valve assembly range from minor to severe. Minor problems may start with leakage due to poor seating of the valve head 36 within the valve seat 37. This poor seating may be due to warping of the valve, the valve seat or the valve guide. As the amount of valve leakage increases, severe problems can result, including overheating of the valve and ultimately complete failure. Other failure modes of the valve assembly include burning and/or breakage of the valve stem or the valve seat. In addition, the valve springs may fail due to fatigue.

Failures of a valve assembly, such as a valve assembly 30, are difficult to detect. Undetected valve-related failures may progress rapidly and can quickly lead to major engine damage. Depending on the nature of the failure, severe damage to an engine can result in less than five minutes. In some cases, pistons, cylinder liners and cylinder heads, as well as fuel injector and connecting rods, can be irreparably damaged due to the effects of a failed valve assembly. Naturally, failures of this degree lead to significant engine downtime. In many applications, such as a mining operation an engine is expected to run 24 hours a day, seven days a week. In these applications, any downtime leads to additional consequential financial injury to the vehicle owner/operator.

Modern engines include an engine control system that continuously monitors several engine operating conditions, such as engine speed, oil pressure and temperature, coolant pressure and temperature, etc. For some engine problems, these monitored conditions provide a timely warning to the vehicle operator before the problems become more severe. However, in the case of valve-related failures, the normally monitored engine operating conditions do not provide adequate warning before severe and even catastrophic engine failures occur. There is therefore a need for a system and method that can accurately and timely detect a valve-related failure and notify the vehicle operator in sufficient time to avoid much more serious damage to the engine.

SUMMARY OF THE INVENTION

The present invention contemplates a system and method for detecting a fault condition in an internal combustion engine, and more particularly for detecting a valve-related fault. The inventive method utilizes the intake air temperatures at each of a plurality of cylinder sections of the engine. An average value of the plurality of intake air temperatures is compared to each of the individual temperatures at discrete time increments. The rate of change of each intake air temperature relative to the average temperature value is assessed to determine if a fault condition has occurred.

In accordance with certain aspects of the invention, a temperature sensor is disposed within each intake manifold. The output from each sensor is provided to an engine control module, which implements a sequence of steps to evaluate the temperature information. In one embodiment, the engine control module includes a microprocessor configured to execute a series of software instructions. In this embodiment, temperature values at each intake manifold, corresponding to a cylinder section, is read and an average value generated. In turn, each intake air temperature value is compared to the average value to produce a difference value for each time increment of operation of the routine.

The difference values for each cylinder section is analyzed to determine the rate of change of the values over time. If the rate of change for a particular cylinder section exceeds a predetermined threshold value, that cylinder section is flagged as having a fault.

In a further feature of the system and method, the temperature differential information for an affected cylinder section is evaluated to determine if the fault is likely due to a valve-related failure. In one embodiment, a plurality of temperature differential values over several time increments are differentiated. The resulting plurality of differentiated values are integrated, or summed, over the time period, which result is compared to a threshold value indicative of a valve-related failure. If the results of this integration exceeds the threshold value, the affected cylinder is further flagged as having a valve-related fault. If the integration results do not exceed the threshold, it is concluded that a valve-related failure has not occurred.

It is one principal object of the invention to provide a system and method that can accurately and quickly identify a failure before more serious consequences result. A further object is achieved by aspects of the invention that permit detection of engine failures that are caused by valve-related failures. Another object is to provide a fault detection system that can rely upon existing engine condition sensors or upon readily sensed engine operating conditions.

One benefit of the invention is that a fault indication can be generated before significant damage can occur to the engine. A further benefit is that the system and method can differentiate between failures that are and are not related to the engine valves.

Yet another benefit of the present invention is that it provides an indication of the cylinder section or engine quadrant affected by the valve-related failure, to facilitate the engine repair process. Other objects and benefits of the invention will become apparent upon consideration of the following written description and accompanying figures.

DESCRIPTION OF THE PREFERRED EMBODIMENTS

For the purposes of promoting an understanding of the principles of the invention, reference will now be made to preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

The present invention provides a system and method for detecting valve-related failures and issuing an alert to the vehicle operator. In the preferred embodiments, the invention evaluates intake air temperature, detects anomalies in that temperature, and evaluates the anomalies to determine if they are related to a valve failure.

Referring to FIG. 1, the engine 10, which has been previously described, includes a number of intake air temperature sensors 20–23, one for each of the air intake manifolds. More specifically, a sensor 20 is provided for the left front manifold 15, a sensor 21 is disposed within the right front manifold 16, a sensor 22 is associated with the left rear manifold 17, and the right rear manifold 18 has a sensor 23. The temperature sensors can be of a variety of known configurations that are adapted to accurately and rapidly sense the temperature of air moving through each of the manifolds, such as a thermocouple or thermistor sensor.

Signals from the sensors pass along signal wires 24 to an engine control module 25. The engine control module 25 can be of conventional design, namely that it accepts input from a variety of engine condition sensors and produces output signals to various engine components to control the operation and performance of the engine. For the purposes of the present invention, the engine control module can include means for executing software that reads and evaluates the sensor output values received along the signal wires 24. Preferably, the engine control module 25 includes a microprocessor that is programmed to execute a sequence of software instructions.

The present embodiment is directed to an engine, such as engine 10 that can be divided into cylinder sections or quadrants. Air is supplied to each quadrant through its own intake manifold, such as manifolds 15–18. Consequently, the corresponding intake air temperature sensors 20–23 provide output signal values in relation to the temperature of air being drawn into the pair of cylinders in each quadrant.

With the present invention, it is possible to identify which quadrant of cylinders includes a defective or failed valve. Where each quadrant includes more than one cylinder it is not possible to accurately differentiate which of the cylinders has the failed valve. Nevertheless, the present invention provides a means for at least isolating the source of the problem to one of the engine quadrants. Of course, if each quadrant includes only one cylinder, the problem can be readily pinpointed to a single cylinder. On the other hand, if each quadrant includes more than two or more cylinders, inspection in an overhaul procedure will readily reveal the failed valve assembly.

Figure 3:
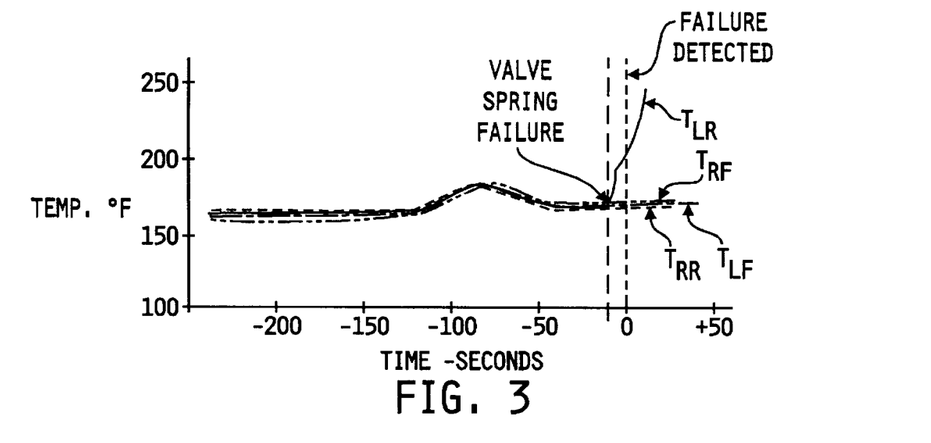
FIG. 3 is a graph of intake manifold temperatures over time prior to, during and after a valve spring failure.

With the engine 10 of the present embodiment, four temperature signals are being provided to the control module 25. As labeled in FIG. 3, the four temperature signals are $T_{LF}$, $T_{LR}$, $T_{RF}$, and $T_{RR}$. These temperatures correspond to the output values from the left front sensor 20, the left rear sensor 22, the right front sensor 21, and the right rear sensor 23, respectively. The graph in FIG. 3 illustrates the effect on intake air temperature for an engine quadrant experiencing a valve spring failure. As the graph reveals, the temperature of each of the sensors, and consequently the air temperature at the intake manifolds for each quadrant, remain fairly uniform and steady for the period of normal engine operation.

However, upon the occurrence of a valve spring failure, the temperature of the intake air of the corresponding quadrant, in this case the left rear quadrant, rises sharply. As can be appreciated from the steep rise in the temperature of the intake air to the left rear quadrant, a catastrophic engine failure can occur fairly rapidly after a valve-related failure. Consequently, rapid detection and intervention is essential. The present invention provides a system and method that can detect and generate an alert in a short period of time after the failure. In some specific cases, the failure alarm is generated within ten seconds of the valve-related failure.

Other engine condition values do not reflect the valve-related failure in a timely fashion. For instance, looking at FIG. 4, a graph of crankcase pressure over time is shown. The crankcase pressure is steady until well after the incidence of the valve failure. In this specific instance, no significant perturbation of the crankcase pressure occurred until more than 100 seconds had elapsed following the failure. More significantly, the crankcase pressure did not exhibit a severe reaction until more than 200 seconds, or over 3 minutes, had passed following the failure. In some cases, by the time the crankcase pressure has dramatically increased, the affected cylinder has experienced significant damage.

Figure 4:
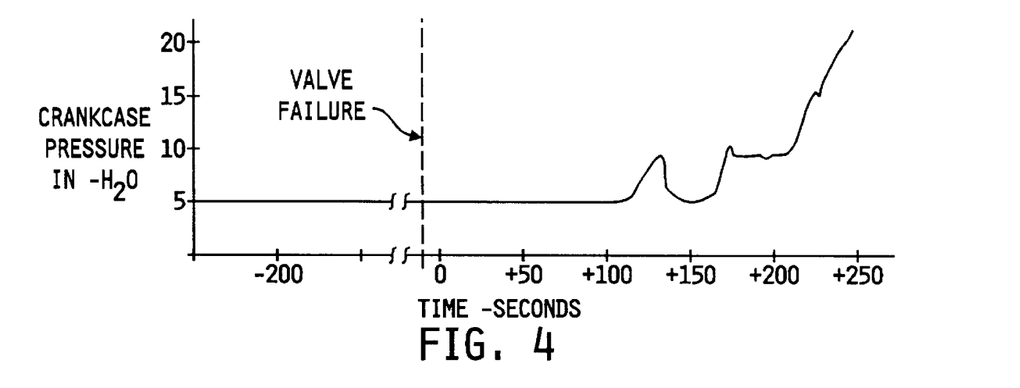
FIG. 4 is a graph of crankcase pressure for the same engine that experienced the valve spring failure graphically depicted in FIG. 3.
Figure 5:
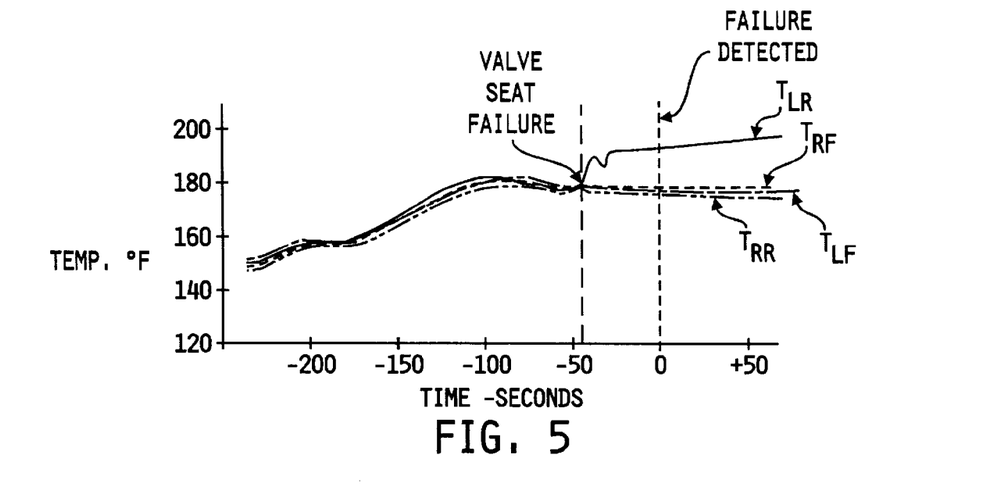
FIG. 5 is a graph of intake air temperatures over time for another engine experiencing a valve seat failure.

Another valve failure mode is graphically depicted in FIG. 5. Again, the intake air temperature for each of the cylinder sections or quadrants is charted over time. In this instance, a valve seat failure occurred and was subsequently detected less than 50 seconds later by the system and method of the present invention. In this case, the intake temperature of the affected cylinder did not rise as dramatically as for the valve spring failure in the graph of FIG. 3. Nevertheless, the intake temperature experienced an uncharacteristic increase, slight decrease and then rapid increase prior to a lower slope temperature increase. While the harshness of the temperature change depicted in FIG. 4 is not as dramatic as in FIG. 3, the results of this valve-related failure can be as severe to the engine. In this case, the more subdued nature of the temperature increase made the detection process a little more difficult and lengthy.

Figures 6, 7, 8:
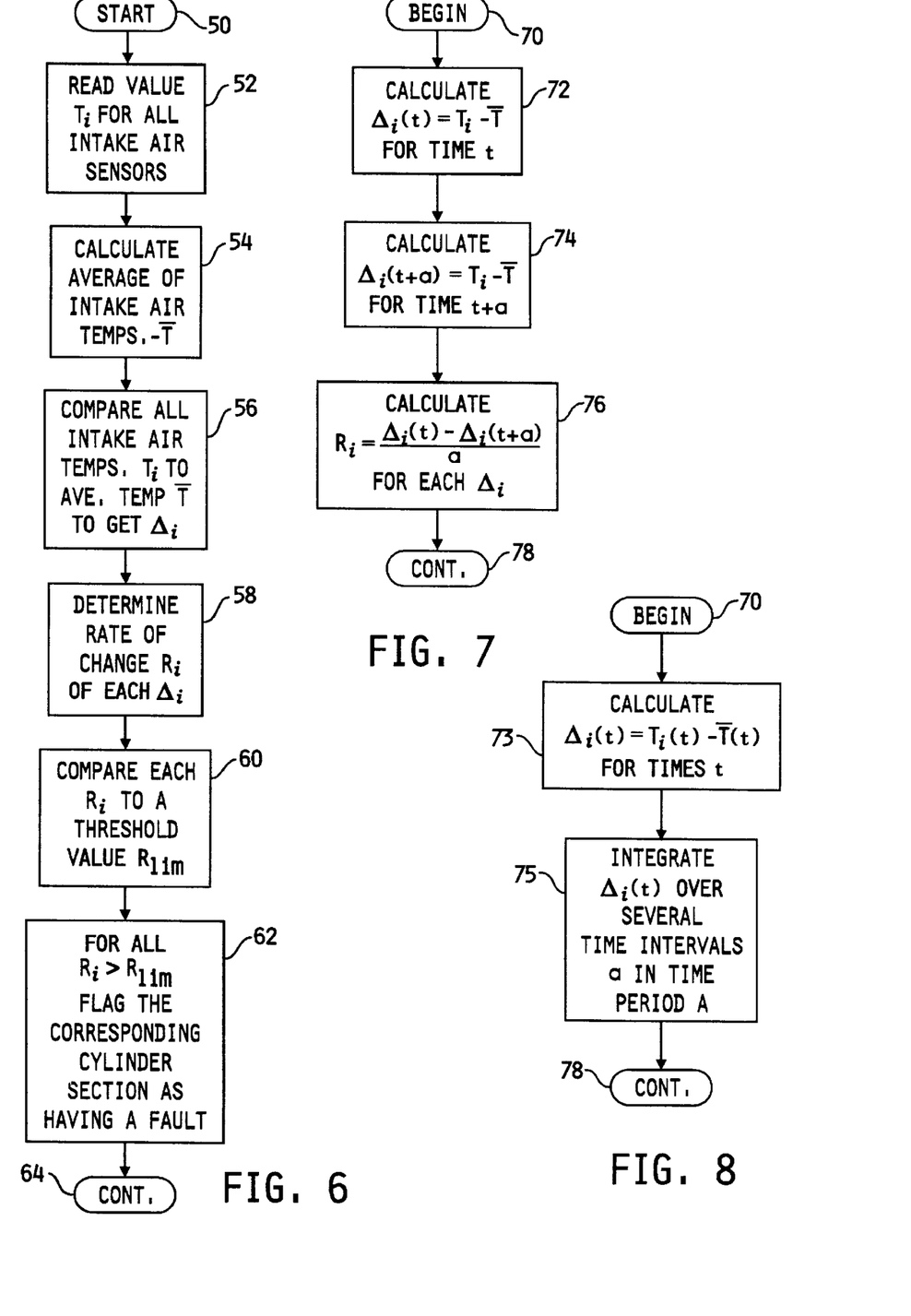
FIG. 6 is a flowchart of steps implemented by an engine control module in accordance with a method of the present invention.
FIG. 7 is a flowchart of a subroutine accessed by steps of the method depicted in the flowchart of FIG. 6.
FIG. 8 is a flowchart of an alternative subroutine accessed by steps of the method depicted in the flowchart of FIG. 6.

In accordance with the present invention, the system, including the temperature sensors 20–23 and the engine control module 25, can operate according to a number of steps shown in the flow chart of FIG. 6. It is understood that in the preferred embodiment, these steps occur as a "background" routine, meaning that the sequence of steps are repeated at predetermined time intervals while other engine-related routines are operating. Given the speed of modern microprocessors, this background routine can operate in 100 millisecond intervals, for example, without disturbing other important functions of the engine control module.

In the preferred embodiment, once the routine starts in step 50, the value $T_i$ for all the intake sensors is read, where the value "i" corresponds to the number of the cylinder section. In the illustrated embodiment; there are four sets of cylinder sections, or quadrants, so that four such values $T_1$, $T_2$, $T_3$, and $T_4$ will be read and processed by the engine control module 25. Of course, the module 25 includes appropriate hardware and/or software to convert the signal generated by the temperature sensors 20–23 to a usable format.

In the next step 52, an average of the intake air temperatures is calculated. This average value can be designated $\overline{T}$. This average intake air temperature value can be derived in a number of ways. Of course, an arithmetic average can be calculated in which each of the temperature values $T_i$ are summed and divided by the number of cylinder sections. Alternatively, the highest and lowest temperature value can be eliminated and the remaining temperatures averaged to calculate the average intake air temperature $\overline{T}$. In a further alternative, the highest and lowest temperature values can be modified or proportioned prior to inclusion in the averaging process. With these latter two approaches, the impact of temperature extremes on the temperature norm is minimized. Other approaches for calculating the value $\overline{T}$ are contemplated, provided the result is a value representing a norm for the intake temperatures over all quadrants.

Once the average intake air temperature $\overline{T}$ is calculated, this value is compared with all of the intake air temperatures $T_i$ in step 56. The result of this step can be a new values $\Delta_i$, which represent the difference between the temperature of the particular quadrant and the average or norm temperature among all of the quadrants.

Using this approach, quadrants for which the temperature varies dramatically relative to the other quadrants can be easily identified. However, instantaneous or short duration aberrations in quadrant intake air temperatures are not necessarily indicative of a valve-related failure. Thus, in step 58, a determination is made as to the rate of change of the value $\Delta_i$ for each of the engine quadrants. This rate of change value can be designated $R_i$. Since a rate of change of the temperature differential is being calculated, temperature values must be accumulated over several discrete times. It is therefore contemplated that an array of values of $T_i$, $\overline{T}$, $\Delta_i$ and $R_i$ will be maintained in memory within the engine control module, with new values being stored at predetermined time intervals. Subroutines to accomplish this calculation of the values $R_i$ are depicted in the flowcharts of FIGS. 7 and 8 and are described in more detail below.

It is the rate of change value $R_i$ for each engine quadrant that is used to determine whether a valve-related failure has occurred in that cylinder section. Thus, in step 60, the rate of change value $R_i$ for each cylinder is compared to a threshold value $R_{LIM}$. The magnitude of the threshold value $R_{LIM}$ is predetermined and preferably maintained in memory within the engine control module 25. This value can be derived empirically for the particular engine. According to this feature of the invention, rate of change values $R_i$ that do not exceed the threshold value are not found to be faulty. In this instance, other engine sensors may reveal other engine problems when monitored by other engine fault detection routines within the engine control module.

In step 62 if the rate of change value for a particular quadrant exceeds the limit value $R_{LIM}$, that cylinder section or quadrant is flagged as having a fault. The program flow then continues at step 64 to subsequent steps implemented by the engine control module 25. In the preferred embodiment, a cylinder section table can be maintained in memory. This table can carry indicia of the health of the cylinder sections, with a fault flag set for each quadrant that fails the test in step 62.

Referring now to FIGS. 7 and 8, two approaches to determining the rate of change value $R_i$ are disclosed. In the first embodiment of FIG. 7, a subroutine begins at step 70 once the main routine reaches step 58. In step 72 of the subroutine, a value for $\Delta_i$ at a time $\overline{T}$ for the cylinder section or quadrant is calculated. In the next step 74, a similar difference value is calculated for a time (T+a), where "a" corresponds to a predetermined interval. As previously explained, the steps of the main routine shown in FIG. 6 can be executed by the engine control module at predetermined time intervals, such as every ten milliseconds. Thus, the more recent value for $\Delta_i$ at the time (T+a) can be generated and stored with each cycle through the steps 50–64.

In accordance with this embodiment, only two $\Delta_i$ values are compared to obtain the rate of change value $R_i$. Of course, the same process steps 72–76 are executed for each of the cylinder sections or engine quadrants, or more particularly for each temperature value $T_i$ to obtain the values $R_i$. The subroutine continues at step 78 to the next step in the main sequence, namely step 60. With this embodiment, dramatic or substantially instantaneous changes in the temperature difference value for a quadrant will trigger a fault flag. Such a rate of change is evident in the graphs of FIGS. 3 and 5. The temperature graph of FIG. 3 shows one such rapid rate of change that would likely be detected in two cycles of the routine of FIG. 6. In FIG. 5, a rapid rate occurred at the inception of the valve failure and at the later perturbation in the temperature signal.

In an alternative embodiment, the subroutine begins at step 70 and proceeds to step 73 where an array of $\Delta_i$ values are calculated for a number of times t. In step 75, this array of values $\Delta_i$ are integrated over several predetermined time intervals "a" for a specific time period. In a specific embodiment, this time interval can be 1.0 seconds, so that if the main routine of FIG. 6 is executed every 100 milliseconds, ten such values for $\Delta_i$ are available for integration. The result of this integration, then, is the rate of change value $R_i$. Again, the subroutine continues at step 78 to step 60 of the main routine in which the newly generated value $R_i$ is compared to the threshold value.

It should be understood that the threshold value $R_{LIM}$ must be adjusted to account for the relative time periods over which the two subroutines of FIGS. 7 and 8 are conducted. For instance, the subroutine of FIG. 7 utilizes a short time period, or low number of routine cycles, over which the change in difference values is evaluated. Since the rate of change value $R_i$ is being determined using data from only two successive cycles, the magnitude of this value will necessarily be smaller than if data is collected over a longer time span. On the other hand, the subroutine of FIG. 8 occurs over a longer period, or greater number of cycles of the main routine. It is anticipated that the rate of change values generated by this subroutine will be larger than the same values for the subroutine of FIG. 7. The appropriate magnitude for $R_{LIM}$ must be set based on the nature of the subroutine used to calculate the $R_i$ values.

In the preferred embodiment, the engine 10 includes four cylinder sections or quadrants, each quadrant including two cylinders. Also in the preferred embodiment, four intake air temperature sensors at 20–23 are utilized. In an adaptation of the present invention, an engine having a single intake air temperature sensor is configured to implement the method according to the present invention. In this instance, the engine control module 25 includes software producing a real-time model of the intake air temperature based upon output values from other engine condition sensors. For example, the intake air temperature model can utilize engine speed values, ambient temperature and/or boost pressure to estimate an idealized intake air temperature.

Once this value has been obtained, it is substituted for the average intake air temperature $\overline{T}$ that is calculated in step 54 of the method illustrated in the flow chart of FIG. 6. This reference temperature value is then used throughout the remaining steps of the routine. For instance, in step 56, a comparison is made of the actual intake air temperature to the reference temperature calculated using the real-time model. In this modified embodiment, only a single temperature difference value, $\Delta$, and a single rate of change value, R, are calculated.

Similarly, the subroutines shown in FIGS. 7 and 8 need be executed only one time corresponding to the single intake air temperature sensor for the engine. In this instance, unless the engine has only one cylinder, the system and method of the invention will only operate to detect the existence of a valve-related failure. Where a single intake air temperature sensor is utilized for a multiple cylinder engine, the present system cannot isolate the affected cylinder in the same manner as for the engine 10 previous embodiment.

When it has been determined that the rate of change of difference of a temperature $T_i$ relative to the average temperature $\overline{T}$ has exceeded the limit value $R_{LIM}$, the existence of some type of anomaly, probably a failure, has been determined. Typically, only a certain proportion of the detected failures can be attributed to the valve apparatus. When a particular quadrant or cylinder section is flagged as having a fault, the troubleshooting process will likely be able to determine the source of the fault. However, the faults detected by the sequence of steps in FIG. 6 may not be attributable to a specific valve apparatus. In this case, the troubleshooting process is more in the form of exploratory surgery, which is necessarily time consuming. Thus, the present invention contemplates a system and method for pinpointing faults that are caused by the valve assembly or that are valve-related.

This additional embodiment of the invention relies upon certain characteristics of the intake air temperatures for an affected cylinder section. Looking at FIGS. 9a and 9b, graphs of intake air temperature over time are shown. In the first graph of FIG. 9a, a particular cylinder $T_i$ shows a dramatic jump in temperature relative to the average temperature among all of the cylinders. In this instance, the dramatic temperature increase can be directly attributed to a valve apparatus failure. Likewise, in the graph shown in FIG. 9b, the intake air temperature $T_i$ experiences a sharp oscillatory perturbation followed by a more gradual increase. Again, empirical data has shown that this intake air temperature signature corresponds to a valve-related failure.

Figure 10A:
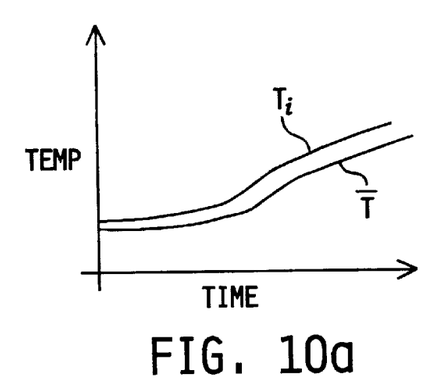
FIGS. 10a–10c are graphs of intake temperature vs. time when a valve-related failure does not exist.
Figure 10B:
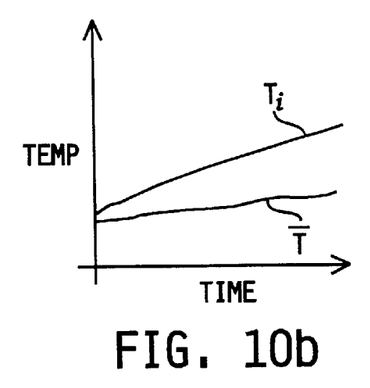
Figure 10C:
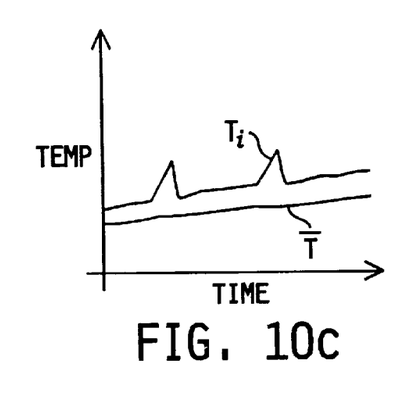

On the other hand, all increases in intake air temperature for a particular quadrant do not necessarily implicate the valve apparatus. Thus, as shown in FIGS. 10a–10c, various intake air temperature signatures have been found to correspond to other types of failures or even normal engine operation. For example, in the graphs of FIG. 10a, the temperature of a particular cylinder $T_i$ gradually increases, but this increase parallels an increase in the average intake air temperature. In this instance, all of the cylinder sections experience a similar temperature increase, although one cylinder may have a proportionally higher overall temperature. Again, empirical data has shown that a temperature curve of this sort is not indicative of a valve-related failure.

Likewise, looking at the graph of FIG. 10B, a cylinder section has a gradually increasing temperature that increases at a rate greater than the increase of the average intake temperature $\overline{T}$. Once again, empirical data has suggested that this temperature change is not indicative of a valve-related failure. Finally, in FIG. 10c, the temperature signature for an engine quadrant experiences momentary spikes, while generally paralleling the average intake temperature $\overline{T}$. When the spike is brief in duration and followed by a normal temperature signature, the failure, if any, usually cannot be pinpointed to the valve apparatus. This type of signal is typical of an intermittent sensor circuit failure.

Figure 9A:
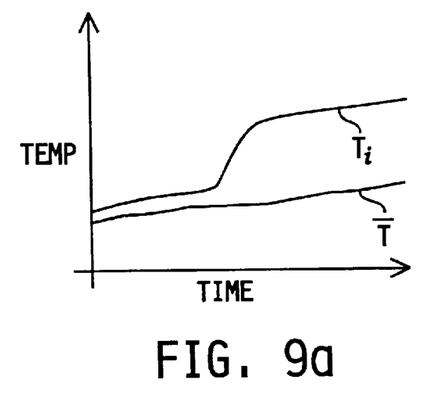
FIGS. 9a and 9b are graphs of intake air temperature vs. time for two valve-related failure modes.
Figure 9B:
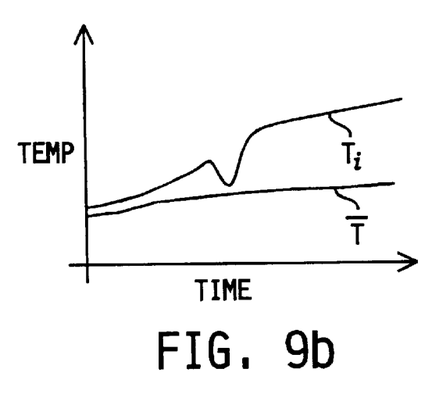

Consequently, the most effective failure detection system and method would be able to distinguish between intake air temperature signatures of FIGS. 9a and 9b over the temperature signatures of FIGS. 10a–10c. The engine control module can include an alternative routine as illustrated in the flow chart of FIG. 11. The starting step 80 of this routine can commence at the continuation step 64 of the flow chart shown in FIG. 6, but most preferably runs generally concurrently with the primary routine. Thus, once a cylinder section has been flagged as having a fault, program flow can be detoured to the steps 80–96 shown in FIG. 11. In step 82, a conditional is evaluated to determine whether a cylinder section has been flagged as faulty. If not, the routine exits at the return step 96.

If a fault flag has been set for a particular cylinder section or quadrant, the sequence of steps flows to step 84 in which a number of values $\Delta_i$ for the affected cylinder are accumulated over a time period N. The number of values depends upon the time increment for exercising the steps of the flow chart of FIG. 11, as well as the time period N. However, it is contemplated that five or more such values $\Delta_i$ are accumulated over the particular time period.

Once the predetermined number of values $\Delta_i$ have been accumulated and stored in memory, these values are each differentiated in step 86. Specifically, they are differentiated with respect to the immediately prior adjacent value. In other words, a differentiated value is calculated from $\Delta_i(t)-\Delta_i(t-1)$. These differentiated values are again stored in memory within the engine control module 25. It is understood that this differentiation step can occur on every cycle through the subroutine of FIG. 11, except for the first time through, coincident with the accumulation of the difference values. Alternatively, step 86 can be executed after the subroutine has accumulated $\Delta_i$ values for the affected quadrant over the entire time period N.

Figure 11:
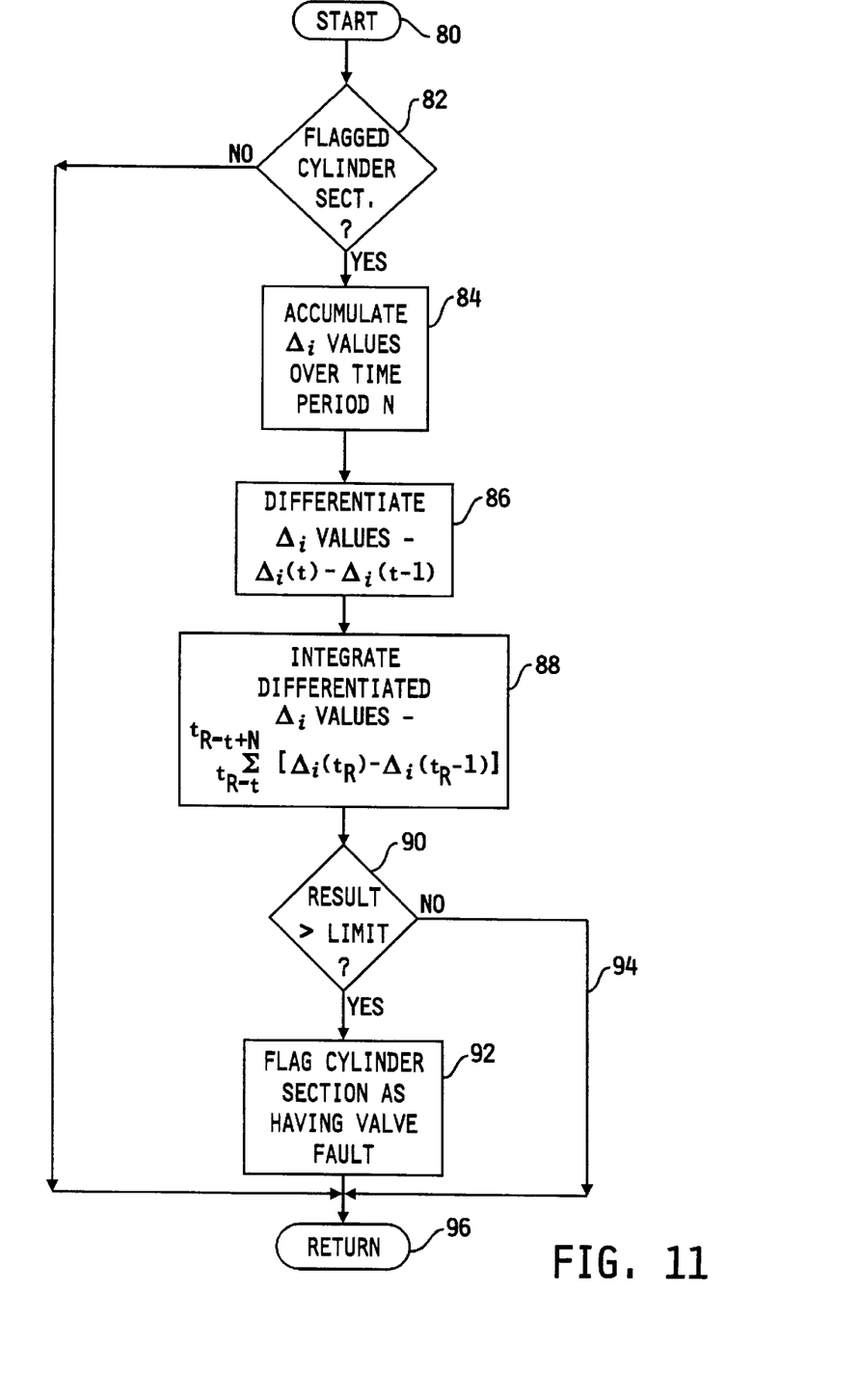
FIG. 11 is a flow chart of steps for a method for differentiating between valve-related and non-valve related faults.

These accumulated differentiated values are integrated in step 88. This integration can occur in a variety of ways. In the preferred embodiment, the differentiated values are summed over the time period N. This differentiation and integration at steps 86 and 88 can be represented by the following equation:

$$SUM_i = \sum_{tk=t}^{tk=t+N} [\Delta_i(t_k) - \Delta_i(t_k - 1)]$$

A substantial shift in the intake air temperature for the affected quadrant will result in a large positive value for $SUM_i$. The results of this integration, $SUM_i$, are evaluated in conditional step 90 to determine whether it exceeds a predetermined limit. If so, then the program flows to step 92 in which the affected previously flagged cylinder section is further flagged as having a valve-related fault. Alternatively, if the result of the conditional step 90 is false, or no, the program flows along branch 94 to the continuation step 96.

Following the continuation step 64 in the flow chart of FIG. 6 or the return step 96 in the flow chart of FIG. 11, the engine control module can execute various fault-related routines. Specifically, some type of fault warning is issued to the vehicle operator to alert the operator as to the imminence of a potentially catastrophic engine failure. In one approach, a top-level warning can be issued to give the vehicle operator a chance to shut the engine down. Alternatively, the engine control module can assume control of the engine and gradually derate the engine to a safer level until the engine can be completely shut down.

When the engine is being evaluated by a diagnostics technician, the cylinder section fault flags can be reviewed. It is contemplated that the engine control module can include a storage location in memory for the fault flags, such as the cylinder section table discussed above. The fault flag information can be subsequently downloaded using a conventional diagnostic tool for engine control modules having a communications port. The engine technician can then utilize the fault flags to determine the affected engine quadrant or cylinder section, and to develop at least a preliminary understanding of the origins of the fault.

It is contemplated that the steps of the method shown in FIGS. 6 and 11 are implemented by a software routine stored within a microprocessor of the engine control module. Accordingly, the various threshold and limit values can also be stored in memory and accessed for comparison at the appropriate steps in the illustrated sequences.

While the preferred embodiment contemplates a software-based approach, the present invention can be implemented in a non-software manner. In particular, analog arithmetic units can be used to read the values of each of the intake air sensors, determine an average value and compare the sensor temperature values with the average value. With this approach, each of the values would be represented by a voltage level, and the eventual output from each of the routines would be represented by a similar voltage level. This resulting voltage level can be converted to a digital signal for use by software-based routines of the engine control module, where appropriate.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

For example, the inventive system can be modified for use with an engine having a single intake manifold and a single temperature sensor, without modeling an ideal intake temperature as previously described. In particular, the difference value $\Delta(t)$, calculated in step 72 of the subroutine of FIG. 7 or in step 73 of the subroutine of FIG. 8, can correspond to the difference between the current temperature at time t and the temperature at time t−a, where "a" is the predetermined time interval discussed above. Similarly, in step 74 of the routine in FIG. 7, the difference value $\Delta(t+a)$ corresponds to $T(t+a)-T(t)$. With this substitution, the remaining steps of the algorithm in FIGS. 6–8, and FIG. 11 can proceed as described above.

As a further alternative with respect to the subroutine of FIG. 7, the values for $\Delta(t)$ and $\Delta(t+a)$ can simply correspond to the temperature value from the sensor at times t and t+a, respectively. Again, the remaining steps of the routines can proceed in the same manner.

What is claimed is:

1. A method for detecting a fault condition in an internal combustion engine, the engine having a number of air intake manifolds supplying air to a corresponding number of engine cylinder sections and a temperature sensor at each of said manifolds, the method comprising the steps of:

reading an output value of the temperature sensor at each of the air intake manifolds;

generating an average value indicative of the average intake air temperature among all of the air intake manifolds;

determining, for each air intake manifold, a rate of change value of the output of each temperature sensor relative to the average value; and identifying an air intake manifold for which the rate of change value exceeds a predetermined threshold, thereby indicating the existence of a fault condition in the corresponding cylinder section.

2. The method for detecting a fault condition according to claim 1, wherein said step of determining an average value includes:

summing the output value of the temperature sensors for all of the air intake manifolds; and dividing the sum by the number of air intake manifolds.

3. The method for detecting a fault condition according to claim 1, wherein said step of determining an average value includes determining the average of the output value for all of the temperature sensors except the sensors having the highest and the lowest output values.

4. The method for detecting a fault condition according to claim 1, wherein said step of determining an average value includes:

determining the highest and lowest output values among the temperature sensors for all of the air intake manifolds;

summing the output value of the temperature sensors for all of the air intake manifolds except the manifolds having such highest and lowest output values;

adding a predetermined ratio of the highest and lowest output values to the sum; and dividing the resulting sum by the number of air intake manifolds reduced by twice said predetermined ratio.

5. The method for detecting a fault condition according to claim 1, wherein said step of determining a rate of change value includes:

calculating a difference value based on the difference between said output value and said average value; and determining the rate of change of said difference value over time.

6. The method for detecting a fault condition according to claim 1, wherein said step of determining a rate of change value includes integrating over a predetermined time period the difference between the output value of the temperature sensor for the air intake manifold and the average value.

7. The method for detecting a fault condition according to claim 1, wherein said step of determining a rate of change value includes comparing the difference between the output value of the temperature sensor for the air intake manifold and the average value at a first time to said difference at a second time.

8. The method for detecting a fault condition according to claim 1, further comprising the step of distinguishing the fault mode of the fault condition for the identified air intake section, said step including:

differentiating the rate of change value for the identified air intake manifold to obtain a derivative value;

summing derivative values calculated over a predetermined time interval; and flagging the engine cylinder section corresponding to the identified air intake manifold as failing under a particular fault mode when the sum of the derivative values exceeds a predetermined limit.

9. The method for detecting a fault condition according to claim 1, in which the engine has one air intake manifold supplying air to one engine cylinder section, the engine further having a microprocessor receiving signals from engine operating condition sensors, wherein the step of determining an average value includes generating an average value from the engine condition sensor signals indicative of a estimated intake air temperature value.

10. A system for detecting a fault condition in an internal combustion engine having a number of air intake manifolds providing air to a corresponding number of engine cylinder sections, comprising:

a sensor in each of the number of air intake manifolds providing an output value indicative of the air temperature in the manifold;

means for generating an average value indicative of the average air temperature among all of the air intake manifolds;

means for generating a rate of change value indicative of the rate of change relative to said average value of said output value of said sensor in each of the number of air intake manifolds; and means for comparing said rate of change value for each of the number of air intake manifolds to a predetermined threshold value and providing a signal indicative of an engine cylinder section for which said rate of change value exceeds said threshold value.

11. The system for detecting a fault condition according to claim 10, further comprising:

an engine control device having a microprocessor, said microprocessor receiving signals from said sensor indicative of said output value; and wherein said means for generating an average value, said means for generating a rate of change value, and said means for comparing include software instructions executed by said microprocessor.

12. The system for detecting a fault condition according to claim 11, in which the engine includes one air intake manifold, wherein:

said engine control device includes other sensors for sensing engine conditions; and said means for generating an average value includes means for estimating an intake air temperature in the one air intake manifold based on values from said other sensors.

13. A method for detecting a fault condition in a valve apparatus of a cylinder of an internal combustion engine, the engine having an intake air manifold for supplying air to the cylinder, the method comprising:

determining a temperature value at predetermined time intervals for the temperature of air in the intake manifold;

determining a rate of change value indicative of the change of the temperature value over at least two time intervals; and indicating the existence of a fault condition in the valve apparatus when the rate of change value exceeds a predetermined threshold.

* * * * *